United States Patent
Garg et al.

(10) Patent No.: US 8,533,423 B2
(45) Date of Patent: Sep. 10, 2013

(54) SYSTEMS AND METHODS FOR PERFORMING PARALLEL MULTI-LEVEL DATA COMPUTATIONS

(75) Inventors: Vikas K. Garg, Bangalore (IN); Raj Gupta, Gurgaon (IN); Ankur Narang, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/976,738

(22) Filed: Dec. 22, 2010

(65) Prior Publication Data

US 2012/0166728 A1    Jun. 28, 2012

(51) Int. Cl.
*G06F 12/00* (2006.01)

(52) U.S. Cl.
USPC .......................................................... 711/173

(58) Field of Classification Search
None
See application file for complete search history.

(56) References Cited

U.S. PATENT DOCUMENTS

| | | | |
|---|---|---|---|
| 4,727,503 A | 2/1988 | McWhirter | |
| 6,385,612 B1 * | 5/2002 | Troisi | 707/752 |
| 7,039,189 B1 | 5/2006 | Kienzle et al. | |
| 7,650,331 B1 | 1/2010 | Dean et al. | |
| 2003/0103523 A1 | 6/2003 | Frossard et al. | |
| 2007/0130185 A1 * | 6/2007 | Miller et al. | 707/791 |
| 2008/0005332 A1 | 1/2008 | Pande et al. | |

OTHER PUBLICATIONS

Guy E. Blelloch et al., "Efficient Scheduling for Parallel Memory Hierarchies." School of Computer Science, Carnegie Mellon, Apr. 21, 2010, 18 pages.

Yonghong Yan et al., "Hierarchical Place Trees: A Portable Abstraction for Task Parallelism and Data Movement," Lecture Notes in Computer Science (including subseries Lecture Notes in Artificial Intelligence and Lecture Notes in Bioinformatics), v 5898 LNCS, p. 172-187, 2010, Languages and Compilers for Parallel Computing—22nd International Workshop, LCPC 2009.

Francois Broquedis et al., "Structuring the Execution of Openmp Applications for Multicore Architectures," Proceedings of the 2010 IEEE International Symposium on Parallel and Distributed Processing, IPDPS 2010, 10 pages.

MapReduce: simplified data processing on large clusters, Dean, Jeffrey and Ghemawat, Sanjay Communication ACM, 2004.

A systolic array parallelizing compiler Ping-Sheng Tseng Journal of Parallel and Distributed Computing. 1990.

Optimal Media Streaming in a Rate Distortion Sense for Guaranteed Service Networks. Olivier Verscheure, Pascal Frossard and J. Y. Le Boudec. International Symposium on Mathematical Theory of Networks and Systems (15th). Aug. 2002.

(Continued)

*Primary Examiner* — Hiep Nguyen
(74) *Attorney, Agent, or Firm* — Griffiths & Seaton PLLC

(57) ABSTRACT

Systems and methods for performing parallel multi-level data computations in a storage system are provided. One system includes a memory storing data, multiple caches, and a processor. The processor is configured to perform the method below. One method includes determining the total amount of data in the memory, dividing the amount of data by each cache capacity to determine the number of nodes needed for processing the data in the memory, and automatically creating the nodes. Here, the nodes form a tree structure including multiple levels where the lowest level includes a first number of nodes equal to the amount of data divided by the cache memory capacity. Also, each lowest level node is configured to process an amount of data equal to the cache memory capacity and each level above the lowest level is configured to include one or more nodes for receiving an input from lower level nodes.

20 Claims, 4 Drawing Sheets

(56) References Cited

OTHER PUBLICATIONS

Automatically Tuned Linear Algebra Software. R. Clint Whaley and Jack Dongarra. In Ninth SIAM Conference on Parallel Processing for Scientific Computing, 1999.

Automated Empirical Optimization of Software and the ATLAS project R. Clint Whaley, Antoine Petitet and Jack Dongarra. Parallel Computing. 2000.

Cilk: An Efficient Multithreaded Runtime System Robert D. Blumofe, Christopher F. Joerg, Bradley C. Kuszmaul, Charles E. Leiserson, Keith H. Randall, and Yuli Zhou Symposium on Principles and Practice of Parallel Programming (PPoPP). 1995.

"SPADE: the System S declarative stream processing engine", Jun. 2008.

* cited by examiner

SYSTEMS AND METHODS FOR PERFORMING PARALLEL MULTI-LEVEL DATA COMPUTATIONS

BACKGROUND OF THE INVENTION

1. Field of the Invention

The present invention relates in general to computing systems, and more particularly, to systems and methods for performing parallel multi-level data computations in a storage system.

2. Description of the Related Art

Various systems and methods for processing large amounts of data are known in the art. Two such systems/methods include Cilk and Map-Reduce processing techniques. While these techniques are effective ways of processing large amounts of data, these systems/methods have shortcomings that reduce their respective effectiveness. For example, Cilk processing techniques often have to overcome problems with functional correctness, whereas Map-Reduce processing techniques require a user and/or programmer to manually map the search and processing functions. In addition, Cilk and Map-Reduce processing techniques perform their respective processing/computation functions serially, which can be expensive in terms of processing time.

SUMMARY OF THE INVENTION

Various embodiments provide systems for performing parallel multi-level data computations in a storage system. One system comprises a memory storing data, a plurality of caches, and a processor coupled to the memory and the plurality of caches. The processor comprises code that, when executed by the processor, cause the processor to determine a total amount of data in the memory to be processed, divide the amount of data by a memory capacity of each cache to determine a plurality of nodes needed for processing the total amount of data, and automatically create the plurality of nodes. In this embodiment, the plurality of nodes form a tree structure comprising a plurality of levels, where a lowest level of the tree structure comprises a first number of nodes equal to the total amount of data divided by the memory capacity of each cache. In addition, each node at the lowest level processes an amount of data equal to the memory capacity of each cache and each level above the lowest level comprises one or more nodes that receive an input from a second number of nodes from a lower level. Here, the second number of nodes is based on a predetermined constraint.

Other embodiments provide methods for performing parallel multi-level data computations in a storage system comprising a memory storing data, a plurality of caches, and a processor coupled to the memory and the plurality of caches. One method comprises determining, by the processor, a total amount of data in the memory to be processed, dividing the amount of data by a memory capacity of each cache to determine a plurality of nodes needed for processing the total amount of data, and automatically creating a plurality of nodes where the plurality of nodes form a tree structure comprising a plurality of levels. In one embodiment, automatically creating the plurality of nodes comprises automatically creating a lowest level of the tree structure comprising a first number of nodes equal to the total amount of data divided by the memory capacity of each cache, configuring each node at the lowest level to process an amount of data equal to the memory capacity of each cache, and configuring each level above the lowest level to comprise one or more nodes for receiving an input from a second number of nodes from a lower level. In this embodiment, the second number of nodes is based on a predetermined constraint.

Also provided are physical computer storage mediums (an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for performing parallel multi-level data computations in a storage system comprising a memory storing data, a plurality of caches each including a memory capacity, and a processor coupled to the memory and the plurality of caches. One physical computer storage medium comprises computer code for determining, by the processor, a total amount of data in the memory to be processed, computer code for dividing the amount of data by a memory capacity of each cache to determine a plurality of nodes needed for processing the total amount of data, and computer code for automatically creating a plurality of nodes where the plurality of nodes form a tree structure comprising a plurality of levels. In one embodiment, the computer code for automatically creating the plurality of nodes comprises computer code for automatically creating a lowest level of the tree structure comprising a first number of nodes equal to the total amount of data divided by the memory capacity of each cache, computer code for configuring each node at the lowest level to process an amount of data equal to the memory capacity of each cache, and computer code for configuring each level above the lowest level to comprise one or more nodes for receiving an input from a second number of nodes from a lower level. In this embodiment, the second number of nodes is based on a predetermined constraint.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems and methods for performing parallel multi-level data computations in a storage system. Also provided are physical computer storage mediums (an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for performing parallel multi-level data computations in a storage system comprising a memory storing data, a plurality of caches each including a memory capacity, and a processor coupled to the memory and the plurality of caches.

Figure 1:
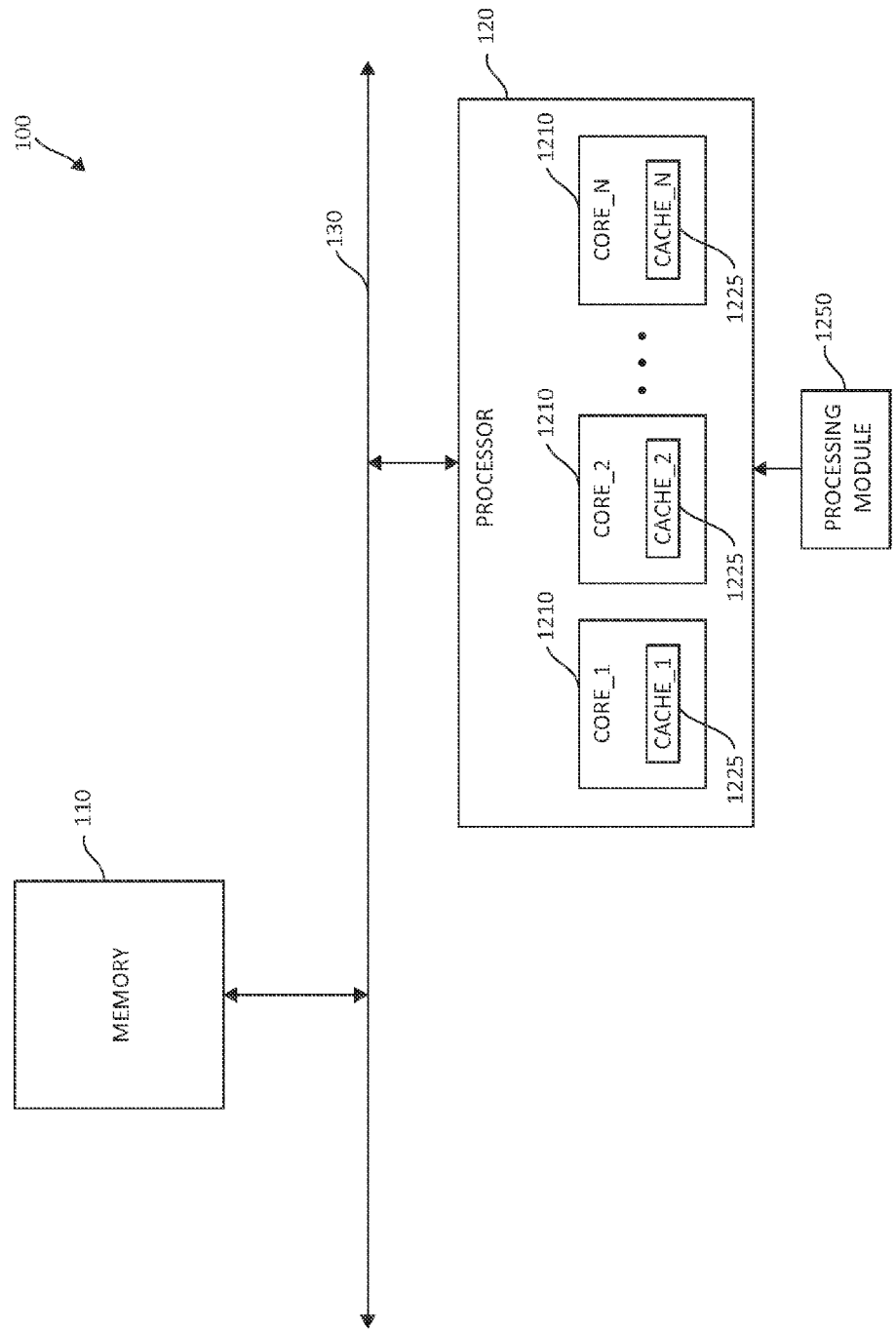
FIG. 1 is a block diagram of one embodiment of a system for performing parallel multi-level data computations in a storage system using a plurality of nodes.

Turning now to the figures, FIG. 1 is a block diagram of one embodiment of a system 100 for performing parallel multi-level data computations in a storage system. At least in the illustrated embodiment, system 100 comprises a memory 110 coupled to a processor 120 via a bus 130 (e.g., a wired and/or wireless bus).

Memory 110 may be any type of memory known in the art of developed in the future capable of storing large amounts of data. In one embodiment, memory 110 is capable of storing between 100 gigabytes and 500 gigabytes of data. In another embodiment, memory 110 is capable of storing between 500 gigabytes and 1 terabyte of data. In still another embodiment, memory 110 is capable of storing in excess of 1 terabyte of data. Regardless of the size of memory 110, processor 120 is capable of performing parallel multi-level data computations on the data stored in memory 110.

Processor 120 is a multi-core processing device. As illustrated in FIG. 1, processor 120 includes two or more processing cores 1210 (e.g., core_1, core_2, . . . core_n) for processing data in memory 110. Each core 1210 comprises a cache 1225 (e.g., cache_1, cache_2, . . . cache_n) for assisting in performing parallel multi-level data computations on the data stored in memory 110. Specifically, core_1 comprises cache_1, core_2 comprises cache_2, . . . core_n comprises cache_n, and each of cache_1, cache_2, . . . cache_n includes a predetermined cache size (e.g., one megabyte to about one gigabyte). Processor 120 further comprises a processing module 1250 that enables processor 120 to perform parallel multi-level data computations on the data stored in memory 110.

Processing module 1250 includes code that, when executed by processor 120, causes processor 120 to perform a method for perform parallel multi-level data computations on the data stored in memory 110. Specifically, when executing processing module 1250, processor 120 is configured to create a node tree 300 (see FIG. 3) for performing parallel multi-level data computations on the data stored in memory 110.

To create node tree 300, processor 120 is configured to determine the amount of data stored in memory 110. After the amount of data in memory 110 is determined, processor 120 is configured to determine the number of computation nodes 310 (see FIG. 3) needed at the lowest level of node tree 300 to process the amount of data stored in memory 110. To determine the number of nodes 310_0 at the lowest level, processor 120, in one embodiment, is configured to divide the amount of data stored in memory 110 by the size of each cache 1225 (i.e., the size of cache_1, cache_2, . . . cache_n). For example, if memory 110 is storing 100 gigabytes of data and each cache is a five-megabyte cache, processor 120 will determine that the lowest level of node tree 300 needs to have 20,480 computation nodes 310 (i.e., 100 GB/5 MB=20,480) at the lowest level.

In another embodiment, to determine the number of nodes 310_0 at the lowest level, processor 120 is configured to divide the amount of data stored in memory 110 by a predetermined multiple of the size of each cache 1225 (i.e., the size of cache_1, cache_2, . . . cache_n). The predetermined multiple may be any integer greater than or equal to one (1), including fractions thereof. For example, if the predetermined multiple size is four (4), memory 110 is storing 900 gigabytes of data, and each cache is a two-megabyte cache, processor 120 will determine that the lowest level of node tree 300 needs to have 115,200 computation nodes 310_0 (i.e., 900 GB/(4·2 MB)=115,200) at the lowest level. Processor 120 is further configured to determine the number of computation nodes 310 in the levels above the lowest level based on the number of computation nodes 310_0 in the lowest level in view of a predetermined constraint.

The predetermined constraint, in various embodiments, limits the number of computation nodes at a lower level from which a node at a higher level may receive input data. In one embodiment, the predetermined constraint is two (2) computation nodes. In another embodiment, the predetermined constraint is three (3) computation nodes. In yet another embodiment, the predetermined constraint is four (4) computation nodes. In still another embodiment, the predetermined constraint is five (5) computation nodes. In other embodiments, the predetermined constraint may be any number of computation nodes greater than five computation nodes.

For example, if the lowest level (e.g., level 0) of node tree 300 includes 115,200 computation nodes and the predetermined constraint is three computation nodes, then the number of computation nodes at level 1 will be 38,400 (i.e., 115,200/3). In this example, the number of computation nodes at level 2 will be 12,800 (i.e., 38,400/3) and the number of computation nodes at level 3 will be 4,267 (i.e., 12,800/3). Here, any remainder is rounded up in determining the number of nodes at a higher level and a computation node at a higher level may receive data from a number of computation nodes in a lower level less than the predetermined constraint (i.e., one or two computation nodes in this example). The number of computation nodes at level 4 will be 1,423 (i.e., 12,800/3), the number of computation nodes at level 5 will be 475 (i.e., 1,423/3), the number of computation nodes at level 6 will be 159 (i.e., 475/3), the number of computation nodes at level 7 will be 53 (i.e., 159/3), the number of computation nodes at level 8 will be 18 (i.e., 53/3), the number of computation nodes at level 9 will be 6 (i.e., 18/3), and the number of computation nodes at level 10 will be 2 (i.e., 6/3). Accordingly, this process continues until a single node (e.g., a master node) is determined at the highest level (i.e., level 11) of node tree 300.

In various embodiments, determining the predetermined constraint is a balance between latency and throughput (or results). Specifically, if a smaller latency is desired, the predetermined constraint will be increased, which will reduce the number of levels of node tree 300. If a better throughput is desired, the predetermined constraint will be decreased, which will increase the number of levels of node tree 300.

The computation nodes 310 created by processor 120, in one embodiment, are homogeneous with respect to one another. Specifically, each computation node 310 in node tree 300 performs the same type of computation (e.g., sum, multiply, etc.). In another embodiment, the computation nodes 310 created by processor 120 are heterogeneous. Specifically, each computation node 310 on a particular level performs the same computation, but computation nodes on different levels perform different computations.

In one embodiment, each of the computation nodes 310_0 at the lowest level (e.g., level 0) of node tree 300 is configured to read the data in memory 110 in parallel with respect to one another. Furthermore, each of the computation nodes 310_0 at the lowest level of node tree 300 is configured to process (e.g., perform a computation on) an amount of data in memory 110 equal to the amount of the size of cache 1225 or the size of cache 1225 multiplied by the predetermined multiple of the cache size discussed above. After the computation has been performed, the computation nodes 310_0 at the lowest level of node tree 300 are configured to provide an input to the computation nodes 310_1 at the next level above the lowest level. For example, if the predetermined constraint is three computation nodes, the computation nodes 310_1 at the next level above the lowest level of node tree 300 will receive inputs from a maximum of three computation nodes 310_0 on the lowest level of node tree 300.

The computation nodes 310_1 on the next level above the lowest level (e.g., level 1) of node tree 300 are configured to merge and process the input data received from the one, two, or three computation nodes 310_0 at the lowest level (which is the same process as the level 0 computation nodes in a homogeneous configuration and a different computation in a heterogeneous configuration) and each provide an input to a computation node 310_2 at a next level above level 1 (e.g., level 2). Similar to above, the computation nodes 310_2 on the next level above level 1 (e.g., level 2) of node tree 300 are configured to merge and process (which is the same process as the level 1 computation nodes in a homogeneous configuration and a different computation in a heterogeneous configuration) the input data received from the one, two, or three computation nodes 310_1 at level 1 and each provide an input to a computation node at a next level (e.g., level 3). This process continues until the master computation node (i.e., the computation node at the highest level of node tree 300) receives input data from the computation nodes at the next level below the highest level of node tree 300, merges the input data, and processes the input data to output a result.

In one embodiment, each computation node in node tree 300 is configured to process its respective portion of the data stored in memory 110 in accordance with a batch mode of execution. Specifically, each computation node 310 in node tree 300 is capable of viewing/processing its respective data in memory 110 multiple times. In another embodiment, each computation node 310 in node tree 300 is configured to process its respective portion of the data stored in memory 110 in accordance with an on-line mode of execution. Specifically, each computation node in node tree 300 is configured to view/process data its respective data in memory 110 that has been modified and not view/process data its respective data in memory 110 that is unmodified. In yet another embodiment, each computation node 310 in node tree 300 is configured to process its respective portion of the data stored in memory 110 in accordance with a streaming mode of execution. Specifically, each computation node 310 in node tree 300 is capable of viewing/processing its respective data in memory 110 one time.

Furthermore, processor 120 is configured to monitor, in real-time, the data in memory 110 for modifications to the data in memory 110. In addition, processor 120 is configured to modify the structure of node tree 300 as needed to accommodate the modification to the data in memory 110.

For example, if an amount data is added to memory 110, processor 120 may be configured to add one or more computation nodes 310_0 to the lowest level of node tree 300 and modify the structure of node tree 300 accordingly. That is, the addition of one or more computation nodes 310_0 in the lowest level of node tree 300 will require that the input data will need to be processed by a computation node 310_1 at the next level above the lowest level, which may also require the addition of one or more computation nodes 310_2 at the next level above this level, which process may be needed for one or more additional higher levels. Moreover, the additional computation nodes 310 will be added in accordance with the homogeneous/heterogeneous structure of the levels of node tree 300. That is, the newly added computation nodes 310 at each level will perform the same process/computation as the other computation nodes at the same level.

In another example, if an amount data is removed/deleted from memory 110, processor 120 may be configured to remove one or more computation nodes 310 to the lowest level of node tree 300 and modify the structure of node tree 300 accordingly. That is, the subtraction of one or more computation nodes 310_0 from the lowest level of node tree 300 may result in less computation nodes 310_1 being needed at the next level above the lowest level, which may also result in needing less computation nodes at the next level above this level or other higher levels.

Figure 2:
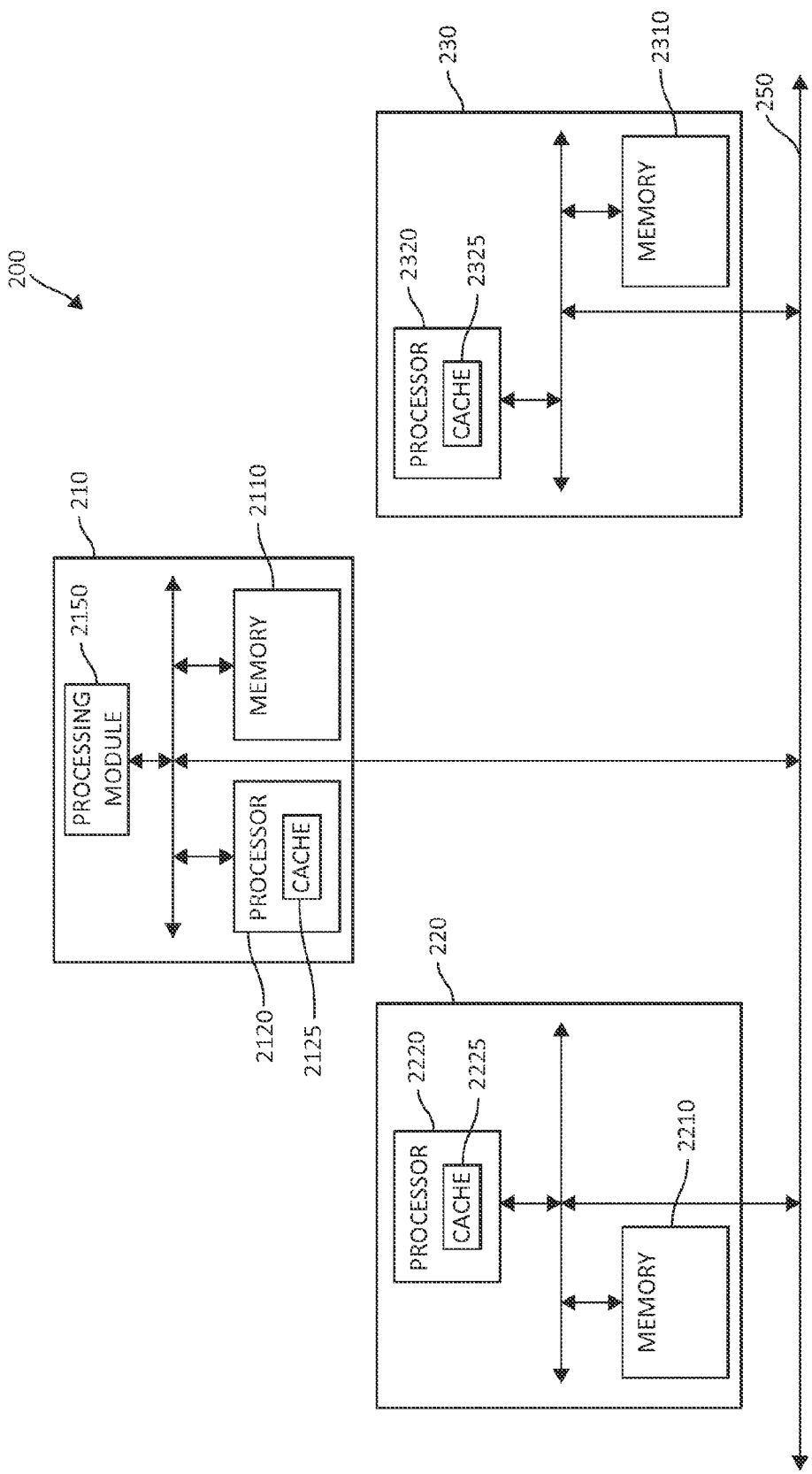
FIG. 2 is a block diagram of one embodiment of another system for performing parallel multi-level data computations in a storage system using a plurality of nodes.

Turning now to FIG. 2, FIG. 2 is a block diagram of one embodiment of a system 200 for performing parallel multi-level data computations in multiple storage systems. At least in the embodiment illustrated in FIG. 2, system 200 comprises a plurality of storage systems (e.g., storage system 210, storage system 220, storage system 230, etc.) coupled to one another via a bus 250 (e.g., a wired and/or wireless bus).

At least in the illustrated embodiment, storage system 210 comprises a memory 2110 coupled to a processor 2120 including a cache 2125 via a bus 2130 (e.g., a wired and/or wireless bus). Similarly, storage system 220 comprises a memory 2210 coupled to a processor 2220 including a cache 2225 via a bus 2230 (e.g., a wired and/or wireless bus), and storage system 230 comprises a memory 2310 coupled to a processor 2320 including a cache 2325 via a bus 2330 (e.g., a wired and/or wireless bus).

In one embodiment, one of storage systems 210, 220, and 230 is designated as a "master" storage system. The designated master storage system is configured to consider storage systems 210, 220, and 230 as a single storage system although each of storage systems 210, 220, and 230 function independent of one another.

Each of memory 2110, memory 2210, and 2310 may be any type of memory known in the art of developed in the future capable of storing large amounts of data. In one embodiment, memory 2110, memory 2210, and 2310 are each capable of storing between 100 gigabytes and 500 gigabytes of data. In another embodiment, memory 2110, memory 2210, and 2310 are each capable of storing between 500 gigabytes and 1 terabyte of data. In still another embodiment, memory 2110, memory 2210, and 2310 are each capable of storing in excess of 1 terabyte of data. Regardless of the size of memory 110, processor 120 is capable of performing parallel multi-level data computations on the data stored in memory 110.

In one embodiment, memory 2110, memory 2210, and memory 2310 are each the same size. In another embodiment, at least two of memory 2110, memory 2210, and memory 2310 are different sizes. In still another embodiment, memory 2110, memory 2210, and memory 2310 are each different sizes.

Storage system is described below as being the master storage system. However, one skilled in the art will appreciate that storage system 220 or storage system 230 could be the master storage system.

As discussed above, processors 2120, 2220, and 2320 each comprise a respective cache (e.g., cache 2125, cache 2225, and cache 2325) for assisting in performing parallel multi-level data computations on the data stored in memory 2110, memory 2210, and 2310. Specifically, processor 2120 comprises cache 2125, processor 2220 comprises cache 2225, and processor 2320 comprises cache 2325, and each of cache 2125, cache 2225, and cache 2325 includes a predetermined cache size (e.g., one megabyte to about one gigabyte). Processor 2120 further comprises a processing module 2150 that enables processor 2120 to perform parallel multi-level data computations on the data stored in memory 2110, memory 2210, and memory 2310.

Processing module 2150 includes code that, when executed by processor 2120, causes processor 2120 to perform a method for perform parallel multi-level data computations on the data stored in memory 2110, memory 2210, and memory 2310. Specifically, when executing processing module 2150, processor 2120 is configured to create a node tree 300 (see FIG. 3) for performing parallel multi-level data computations on the data stored in memory 2110, memory 2210, and memory 2310.

To create node tree 300, processor 2120 is configured to determine the amount of data stored in memory 2110, memory 2210, and memory 2310. After the amount of data in memory 2110, memory 2210, and memory 2310 is determined, processor 2120 is configured to determine the number of computation nodes 310 (see FIG. 3) needed at the lowest level of node tree 300 to process the amount of data stored in memory 2110, memory 2210, and memory 2310. To determine the number of nodes 310_0 at the lowest level, processor 2120, in one embodiment, is configured to divide the amount of data stored in memory 2110, memory 2210, and memory 2310 by the size of each cache (i.e., the size of cache 2125, cache 2225, and cache 2325) similar to the embodiments discussed above.

In another embodiment, to determine the number of nodes 310_0 at the lowest level, processor 2120 is configured to divide the amount of data stored in memory 2110, memory 2210, and memory 2310 by a predetermined multiple of the size of each cache (i.e., the size of cache 2125, cache 2225, and cache 2325) similar to the embodiments discussed above. Processor 2120 is further configured to determine the number of computation nodes 310 in the levels above the lowest level based on the number of computation nodes 310_0 in the lowest level in view of a predetermined constraint.

The predetermined constraint, in various embodiments, limits the number of computation nodes at a lower level from which a node at a higher level may receive input data similar to the embodiments discussed above. In one embodiment, the predetermined constraint is two (2) computation nodes. In another embodiment, the predetermined constraint is three (3) computation nodes. In yet another embodiment, the predetermined constraint is four (4) computation nodes. In still another embodiment, the predetermined constraint is five (5) computation nodes. In other embodiments, the predetermined constraint may be any number of computation nodes greater than five computation nodes.

In various embodiments, determining the predetermined constraint is a balance between latency and throughput (or results). Specifically, if a smaller latency is desired, the predetermined constraint will be increased, which will reduce the number of levels of node tree 300. If a better throughput is desired, the predetermined constraint will be decreased, which will increase the number of levels of node tree 300.

The computation nodes 310 created by processor 2120, in one embodiment, are homogeneous with respect to one another. Specifically, each computation node 310 in node tree 300 performs the same type of computation (e.g., sum, multiply, etc.). In another embodiment, the computation nodes 310 created by processor 2120 are heterogeneous. Specifically, each computation node 310 on a particular level performs the same computation, but computation nodes 310 on different levels perform different computations.

In one embodiment, each of the computation nodes 310_0 at the lowest level (e.g., level 0) of node tree 300 is configured to read the data in memory 2110, memory 2210, and memory 2310 in parallel with respect to one another. Furthermore, each of the computation nodes 310_0 at the lowest level of node tree 300 is configured to process (e.g., perform a computation on) an amount of data in memory 2110, memory 2210, and memory 2310 equal to the amount of the size of cache 2125, cache 2225, and 2325 or the size of caches 2125, 225, and 2325 multiplied by the predetermined multiple of the cache size discussed above. After the computation has been performed, the computation nodes 310_0 at the lowest level of node tree 300 are configured to provide an input to the computation nodes 310_1 at the next level above the lowest level. For example, if the predetermined constraint is three computation nodes, the computation nodes 310_1 at the next level above the lowest level of node tree 300 will receive inputs from a maximum of three computation nodes 310_0 on the lowest level of node tree 300.

The computation nodes 310_1 on the next level above the lowest level (e.g., level 1) of node tree 300 are configured to merge and process the input data received from the one, two, or three computation nodes 310_0 at the lowest level (which is the same process as the level 0 computation nodes in a homogeneous configuration and a different computation in a heterogeneous configuration) and each provide an input to a computation node 310_2 at a next level above level 1 (e.g., level 2). Similar to above, the computation nodes 310_2 on the next level above level 1 (e.g., level 2) of node tree 300 are configured to merge and process (which is the same process as the level 1 computation nodes in a homogeneous configuration and a different computation in a heterogeneous configuration) the input data received from the one, two, or three computation nodes at level 1 and each provide an input to a computation node at a next level (e.g., level 3). This process continues until the master computation node (i.e., the computation node at the highest level of node tree 300) receives input data from the computation nodes at the next level below the highest level of node tree 300, merges the input data, and processes the input data to output a result.

In one embodiment, each computation node in node tree 300 is configured to process its respective portion of the data stored in memory 2110, memory 2210, and memory 2310 in accordance with a batch mode of execution. Specifically, each computation node 310 in node tree 300 is capable of viewing/processing its respective data in memory 110 multiple times. In another embodiment, each computation node 310 in node tree 300 is configured to process its respective portion of the data stored in memory 2110, memory 2210, and memory 2310 in accordance with an on-line mode of execution. Specifically, each computation node in node tree 300 is configured to view/process data its respective data in memory 2110, memory 2210, and memory 2310 that has been modified and not view/process data its respective data in memory 2110, memory 2210, and memory 2310 that is unmodified. In yet another embodiment, each computation node 310 in node tree 300 is configured to process its respective portion of the data stored in memory 2110, memory 2210, and memory 2310 in accordance with a streaming mode of execution. Specifically, each computation node in node tree 300 is capable of viewing/processing its respective data in memory 2110, memory 2210, and memory 2310 one time.

Furthermore, processor 2120 is configured to monitor, in real-time, the data in memory 2110, memory 2210, and memory 2310 for modifications to the data in memory 2110, memory 2210, and memory 2310. In addition, processor 2120 is configured to modify the structure of node tree 300 as needed to accommodate the modification to the data in memory 2110, memory 2210, and/or memory 2310.

For example, if an amount data is added to memory 2110, memory 2210, and/or memory 2310, processor 2120 may be configured to add one or more nodes 310_0 to the lowest level of node tree 300 and modify the structure of node tree 300 accordingly. That is, the addition of one or more computation nodes 310_0 in the lowest level of node tree 300 will require that the input data will need to be processed by a computation node 310_1 at the next level above the lowest level, which may also require the addition of one or more computation nodes 310_2 at the next level above this level, which process may be needed for one or more additional higher levels. Moreover, the additional computation nodes 310 will be added in accordance with the homogeneous/heterogeneous structure of the levels of node tree 300. That is, the newly added computation nodes 310 at each level will perform the same process/computation as the other computation nodes at the same level.

In another example, if an amount data is removed/deleted from memory 2110, memory 2210, and/or memory 2310, processor 2120 may be configured to remove one or more nodes 310_0 to the lowest level of node tree 300 and modify the structure of node tree 300 accordingly. That is, the subtraction of one or more computation nodes 310_0 from the lowest level of node tree 300 may result in less computation nodes 310_1 being needed at the next level above the lowest level, which may also result in needing less computation nodes at the next level above this level or other higher levels.

Furthermore, processor 220 is configured to recognize the hardware in system 200 and leverage the mapping of node tree 300 in accordance with the hardware in system 200. Specifically, in one embodiment, processing module 2150 comprises and/or has access to a hardware configuration file that enables processor 2120 to efficiently utilize the hardware structure in mapping node tree 300. For example, the hardware configuration file enables processor 2120 to recognize which processor (e.g., processor 2120, processor 2220, or 2320) is most proximate (e.g., geographically) to the location of the data and create a computation node 310 on that particular processor. For example, data stored in memory 2310 will be processed by a computation node 310 created in processor 2320 and/or cache 2325 because processor 2320 and/or cache 2325 are closer to memory 2310 than processors 2120 and 2220 and caches 2125 and 2225.

With this said, system 200 is completely scalable. That is, the hardware configuration file is capable of being modified to add/subtract storage systems and processor 2120 is configured to modify node tree 300 accordingly.

In various embodiments, node tree 300 comprises a fault-tolerant design. Specifically, each computation node 310 in node tree 300 is configured to determine if other computation node(s) 310 spatially proximate to each respective computation node 300 are malfunctioning and/or have failed and, in response thereto, are configured to perform the functions and/or processing of the malfunctioning/failed computation node(s) 310. In one embodiment, when a particular computation node 310 determines that another spatially proximate computation node 310 is malfunctioning and/or has failed, the particular computation node 310 perform the functions and/or processing of the malfunctioning/failed computation node 310 beginning from the latest saved state of execution of the malfunctioning/failed computation node 310.

Although FIG. 2 illustrates system 200 as comprising storage systems 210, 220, and 230, various other embodiments contemplate that system 200 may include only one or two of storage systems 210, 220, and 230. In various other embodiments, system 200 may include more than three storage systems.

Figure 3:
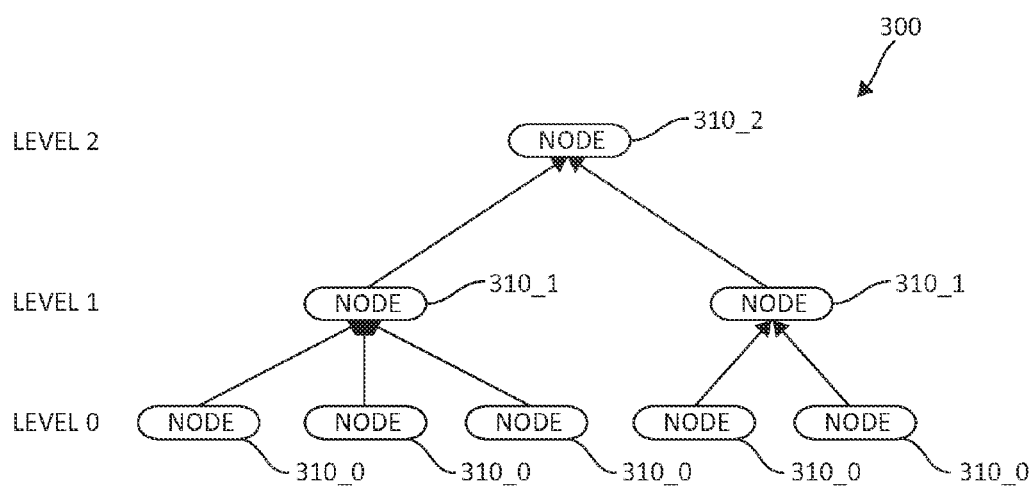
FIG. 3 is a block diagram illustrating a tree structure formed by the plurality of nodes created by the system in FIGS. 1 and 2.

With reference now to FIG. 3, FIG. 3 is a block diagram of one example of node tree 300. In this example, node tree 300 comprises five (5) computation nodes 310_0 at level 0 that read and process data. Computation nodes 310_0 each transmit input data to computation nodes 310_1 on level 1. In this example, the predetermined constraint is three (3) computation nodes from a lower level. As such, level 1 uses two computation nodes 310_1 at level 1; a first computation node 310_1 receives and processes input data from three (3) computation nodes 310_0 and a second computation node 310_1 receives and processes input data from two (2) computation nodes 310_0. At the highest level (i.e., level 2 in this example), computation node 310_2 receives and processes input data from the two (2) computation nodes 310_1 on level 1.

In various embodiments, node tree 300 comprises a fault-tolerant design. Specifically, each computation node 310 in node tree 300 is configured to determine if other computation node(s) 310 that are spatially proximate to each respective computation node 300 are malfunctioning and/or have failed and, in response thereto, are configured to perform the functions and/or processing of the malfunctioning/failed computation node(s) 310. In one embodiment, when a particular computation node 310 determines that a spatially proximate computation node 310 is malfunctioning and/or has failed, the particular computation node 310 perform the functions and/or processing of the malfunctioning/failed computation node 310 beginning from the latest saved state of execution of the malfunctioning/failed computation node 310.

Figure 4:
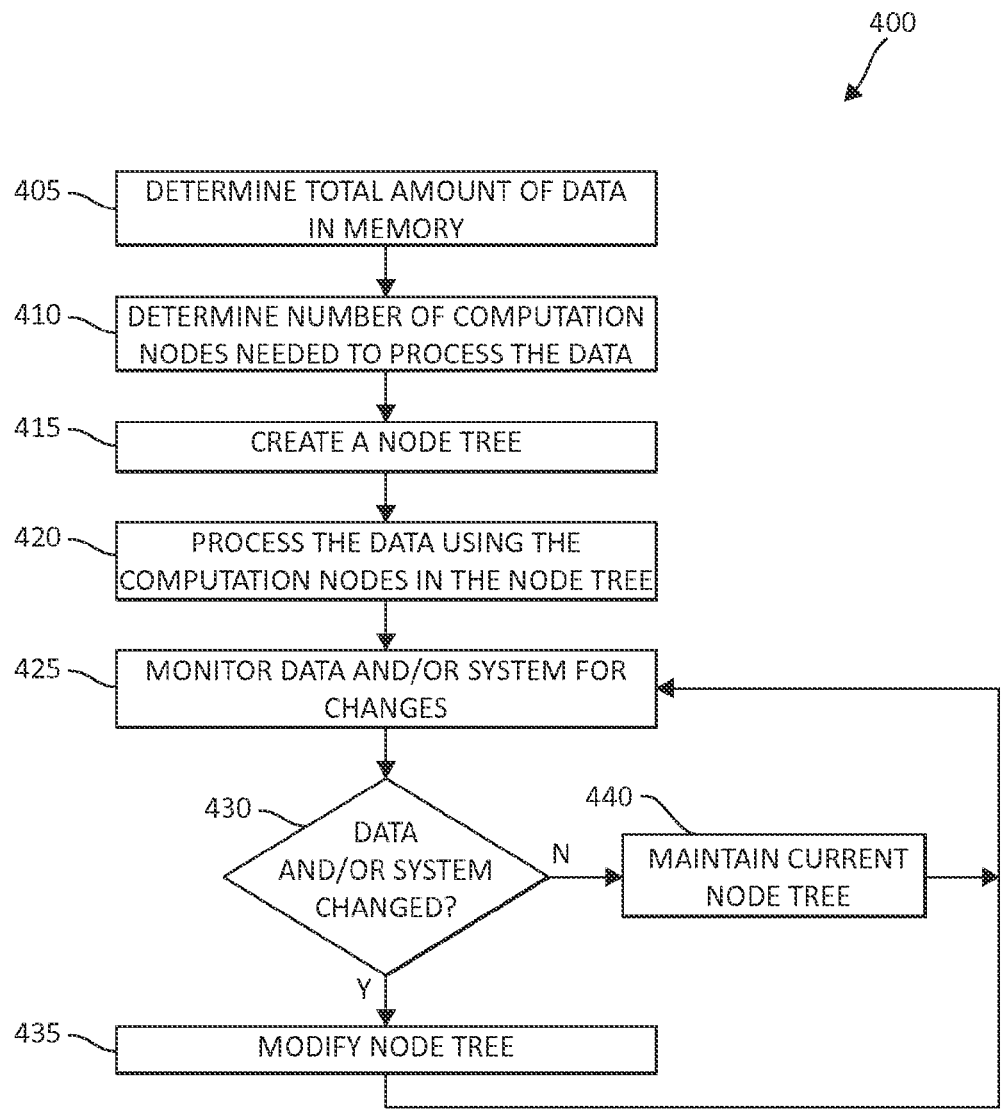
FIG. 4 is a flow diagram of one embodiment of a method for performing parallel multi-level data computations in a storage system.

Turning now to FIG. 4, FIG. 4 is a flow diagram of one embodiment of a method 400 for performing parallel multi-level data computations in a storage system (e.g., storage system 100 or storage system 200). At least in the illustrated embodiment, method 400 begins by a processor (e.g., processor 120 or processor 2120) determining a total amount of data in the memory (e.g., memory 110 or memories 2110, 2210, and 2310) to be processed (block 405) and determining the number of computation nodes (e.g., computation nodes 310) needed for processing the total amount of data based on the total amount of data in the memory (block 410). In one embodiment, the number of computation nodes needed is determined by dividing the amount of data by the memory capacity of each cache (e.g., cache 1225 or caches 2125, 2225, and 2325).

Method 400 further comprises automatically creating a node tree (e.g., node tree 300) comprising plurality of computation nodes (e.g., computation nodes 310) arranged in a plurality of levels (block 415). In one embodiment, the lowest level of the node tree is automatically created and comprises a number of nodes equal to the total amount of data divided by the memory capacity of each cache. Furthermore, each node at the lowest level is configured to process an amount of data equal to the memory capacity of each cache and each level above the lowest level is configured to comprise one or more nodes for receiving an input from a number of nodes at a lower level. In addition, the number of nodes is based on a predetermined constraint consistent with the various embodiments described above.

Furthermore, method 400 comprises processing the data utilizing the computation nodes in the node tree (block 420). In one embodiment, the data is processed in accordance with a batch processing technique. In another embodiment, the data is processed in accordance with an online processing technique. In still another embodiment, the data is processed in accordance with a streaming processing technique.

Method 400 further comprises monitoring the total amount of data and/or the physical structure of the system for changes in real time (block 425) and determining if the amount of data and/or structure of the system have changed (block 430). If the amount of data and/or structure of the storage system have changed, method 400 comprises modifying the structure of the node tree (block 435). Method 400 then continues to monitor the total amount of data and/or the physical structure of the system for changes in real time (block 425) and determining if the amount of data and/or structure of the system have changed (block 430).

If the amount of data and/or structure of the storage system have not changed, method 400 comprises maintaining the structure of the node tree (block 440). Method 400 then continues to monitor the total amount of data and/or the physical structure of the system for changes in real time (block 425) and determining if the amount of data and/or structure of the system have changed (block 430).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for performing parallel multi-level data computations in a storage system, comprising:
    a memory storing data;
    a plurality of caches, each cache including a memory capacity; and
    a processor coupled to the memory and the plurality of caches, wherein the processor comprises code that, when executed by the processor, cause the processor to:
        determine a total amount of data in the memory to be processed,
        divide the amount of data by a memory capacity of each cache to determine a plurality of computation nodes needed for processing the total amount of data, and
        automatically create the plurality of computation nodes, the plurality of computation nodes forming a tree structure comprising a plurality of levels, wherein:
            a lowest level of the tree structure comprises a first number of computation nodes equal to the total amount of data divided by the memory capacity of each cache,
            each computation node at the lowest level processes an amount of data equal to the memory capacity of each cache, and
            each level above the lowest level comprises one or more computation nodes that receive an input from a second number of computation nodes from a lower level, the second number of computation nodes is based on a predetermined constraint.

2. The system of claim 1, wherein the predetermined constraint is less than or equal to three computation nodes.

3. The system of claim 1, wherein the memory capacity of each cache is in the range of about 2 megabytes of data to about 1 gigabyte of data.

4. The system of claim 1, wherein each of the plurality of computation nodes is configured to:
    determine if one or more other computation nodes is malfunctioning; and
    perform the processing functions of the one or more malfunctioning computation nodes.

5. The system of claim 1, wherein each of the plurality of computation nodes is configured to process the total amount of data in accordance with a batch or an online processing technique.

6. The system of claim 1, wherein each of the plurality of computation nodes is configured to process the total amount of data in accordance with a streaming processing technique.

7. The system of claim 1, wherein the processor is further configured to:
    monitor one of the total amount of data and a physical structure of the system for changes in real time; and
    change, in real time, a structure of the tree structure based on the one of a change in the total amount of data and a change in the physical structure of the system.

8. A method for performing parallel multi-level data computations in a storage system comprising a memory storing data, a plurality of caches each including a memory capacity, and a processor coupled to the memory and the plurality of caches, the method comprising:
    determining, by the processor, a total amount of data in the memory to be processed;
    dividing the amount of data by a memory capacity of each cache to determine a plurality of computation nodes needed for processing the total amount of data; and
    automatically creating a plurality of computation nodes, the plurality of computation nodes forming a tree structure comprising a plurality of levels, wherein automatically creating the plurality of computation nodes comprises:
        automatically creating a lowest level of the tree structure comprising a first number of computation nodes equal to the total amount of data divided by the memory capacity of each cache,
        configuring each computation node at the lowest level to process an amount of data equal to the memory capacity of each cache, and
        configuring each level above the lowest level to comprise one or more computation nodes for receiving an input from a second number of computation nodes from a lower level, the second number of computation nodes is based on a predetermined constraint.

9. The method of claim 8, wherein the predetermined constraint comprises limiting the second number of computation nodes to less than or equal to three computation nodes.

10. The method of claim 8, wherein the memory capacity of each cache is in the range of about 2 megabytes of data to about 1 gigabyte of data.

11. The method of claim 8, wherein automatically creating the plurality of computation nodes comprises configuring each of the plurality of computation nodes to process the total amount of data in accordance with a batch processing technique.

12. The method of claim 8, wherein automatically creating the plurality of computation nodes comprises configuring each of the plurality of computation nodes to process the total amount of data in accordance with an online processing technique.

13. The method of claim 8, wherein automatically creating the plurality of computation nodes comprises configuring each of the plurality of computation nodes to process the total amount of data in accordance with a streaming processing technique.

14. The method of claim 8, further comprising:
    monitoring one of the total amount of data and a physical structure of the storage system for changes in real time; and
    changing, in real time, a structure of the tree structure based on one of a change in the total amount of data and a change in the physical structure of the storage system.

15. A non-transitory machine-readable storage medium comprising a computer program codes when executed by a machine for performing parallel multi-level data computations in a storage system comprising a memory storing data, a plurality of caches each including a memory capacity, and a processor coupled to the memory and the plurality of caches, computer program codes comprising:
    computer code for determining, a total amount of data in the memory to be processed;
    computer code for dividing the amount of data by a memory capacity of each cache to determine a plurality of computation nodes needed for processing the total amount of data; and
    computer code for automatically creating a plurality of computation nodes, the plurality of computation nodes forming a tree structure comprising a plurality of levels, wherein the computer code for automatically creating the plurality of computation nodes comprises:

computer code for automatically creating a lowest level of the tree structure comprising a first number of computation nodes equal to the total amount of data divided by the memory capacity of each cache, computer code for configuring each computation node at the lowest level to process an amount of data equal to the memory capacity of each cache, and computer code for configuring each level above the lowest level to comprise one or more computation nodes for receiving an input from a second number of computation nodes from a lower level, the second number of computation nodes is based on a predetermined constraint.

16. The non-transitory machine-readable storage medium of claim 15, wherein the predetermined constraint comprises limiting the second number of computation nodes to less than or equal to three computation nodes.

17. The non-transitory machine-readable storage medium of claim 15, wherein the computer code for automatically creating the plurality of computation nodes comprises computer code for configuring each of the plurality of computation nodes to process the total amount of data in accordance with a batch processing technique.

18. The non-transitory machine-readable storage medium of claim 15, wherein the computer code for automatically creating the plurality of computation nodes comprises computer code for configuring each of the plurality of computation nodes to process the total amount of data in accordance with an online processing technique.

19. The non-transitory machine-readable storage medium of claim 15, wherein the computer code for automatically creating the plurality of computation nodes comprises computer code for configuring each of the plurality of computation nodes to process the total amount of data in accordance with a streaming processing technique.

20. The non-transitory machine-readable storage medium of claim 15, further comprising:

computer code for monitoring one of the total amount of data and a physical structure of the storage system for changes in real time; and computer code for changing, in real time, a structure of the tree structure based on one of a change in the total amount of data and a change in the physical structure of the storage system.

* * * * *